(12) United States Patent
Goldsack et al.

(10) Patent No.: US 6,959,406 B2
(45) Date of Patent: Oct. 25, 2005

(54) BLOCK ERROR RATIO MEASUREMENTS

(75) Inventors: Peter James Sutherland Goldsack, Edinburgh (GB); Gerard Fitzpatrick, Midlothian (GB); Abijah M. Perkins, Liberty Lake, WA (US)

(73) Assignee: Agilent Technologies, Inc., Palo Alto, CA (US)

( * ) Notice: Subject to any disclaimer, the term of this patent is extended or adjusted under 35 U.S.C. 154(b) by 418 days.

(21) Appl. No.: 09/875,415

(22) Filed: Jun. 5, 2001

(65) Prior Publication Data

US 2001/0052091 A1 Dec. 13, 2001

(30) Foreign Application Priority Data

Jun. 7, 2000 (GB) .............................. 0013746
Dec. 18, 2000 (EP) .............................. 00311334

(51) Int. Cl.[7] .............................. G06F 11/00
(52) U.S. Cl. .............................. 714/704; 714/748
(58) Field of Search .............................. 714/748, 704; 370/231

(56) References Cited

U.S. PATENT DOCUMENTS

| | | | | |
|---|---|---|---|---|
| 5,444,718 A | * | 8/1995 | Ejzak et al. | 714/748 |
| 5,592,468 A | * | 1/1997 | Sato | 370/252 |
| 5,901,342 A | * | 5/1999 | Heiskari et al. | 455/11.1 |
| 5,946,320 A | * | 8/1999 | Decker | 370/428 |
| 6,208,620 B1 | * | 3/2001 | Sen et al. | 370/231 |
| 6,363,425 B1 | * | 3/2002 | Hook et al. | 709/226 |
| 6,532,233 B1 | * | 3/2003 | Matsunaga et al. | 370/390 |
| 6,567,375 B2 | * | 5/2003 | Balachandran et al. | 370/204 |

FOREIGN PATENT DOCUMENTS

EP 0 994 597 4/2000

OTHER PUBLICATIONS http://www.webopedia.com/quick_ref/OSI_Layers.asp, The 7 Layers of the OSI Model.*
Annamalai, A. and Vijay K. Bhargava, "Analysis and Optimization of Adaptive Multicopy Transmission ARQ Protocols for Time–Varying Channels," *IEEE Transactions on Communications*, vol. 46, No. 10, pp. 1356–1368 (Oct. 1998).
Henry, B., "Getting Started in Digital Communications: Part 4 —Amtor . . . and Beyond?" *OST*, pp. 34–42 (Jun. 1992).
Lonsdale, T., "Amtor," INTERNET: http://home.teleport.com/~nb6z/amtor.htm, date unknown, 3 pages total.

* cited by examiner

*Primary Examiner*—Joseph D. Torres

(57) ABSTRACT

Block error rate (BLER) measurements are made on a mobile telephone handset without imposing an undesirable processing burden on the handset. An information block flow is maintained by sending repeated message blocks from a test set which are defined at a selected layer in the protocol stack below the topmost layer. Ack/nack messages sent by the handset in response to the message blocks are monitored to determine whether the message blocks have been correctly transported, and thus derive the BLER. The message blocks sent by the test set can either be empty GMM_INFORMATION messages, or LLC frames with invalid frame check sequences.

22 Claims, 4 Drawing Sheets

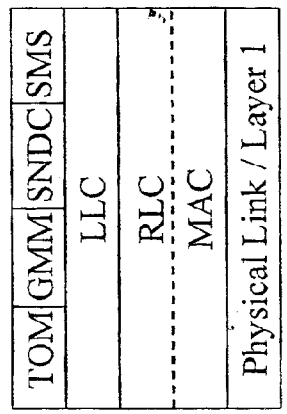
Fig.1
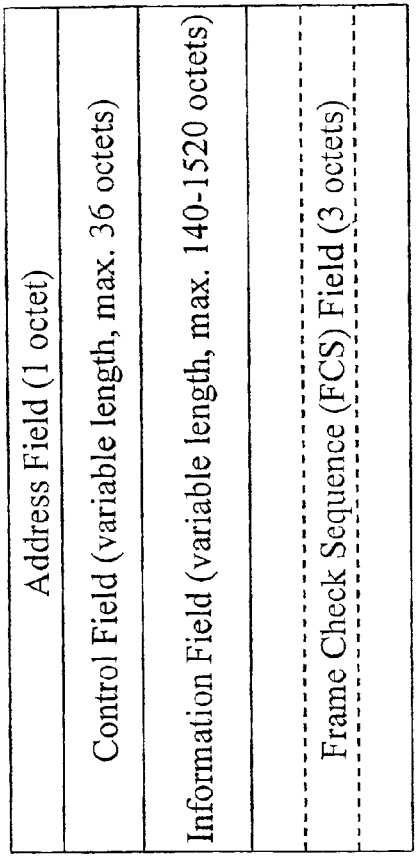
Fig.2
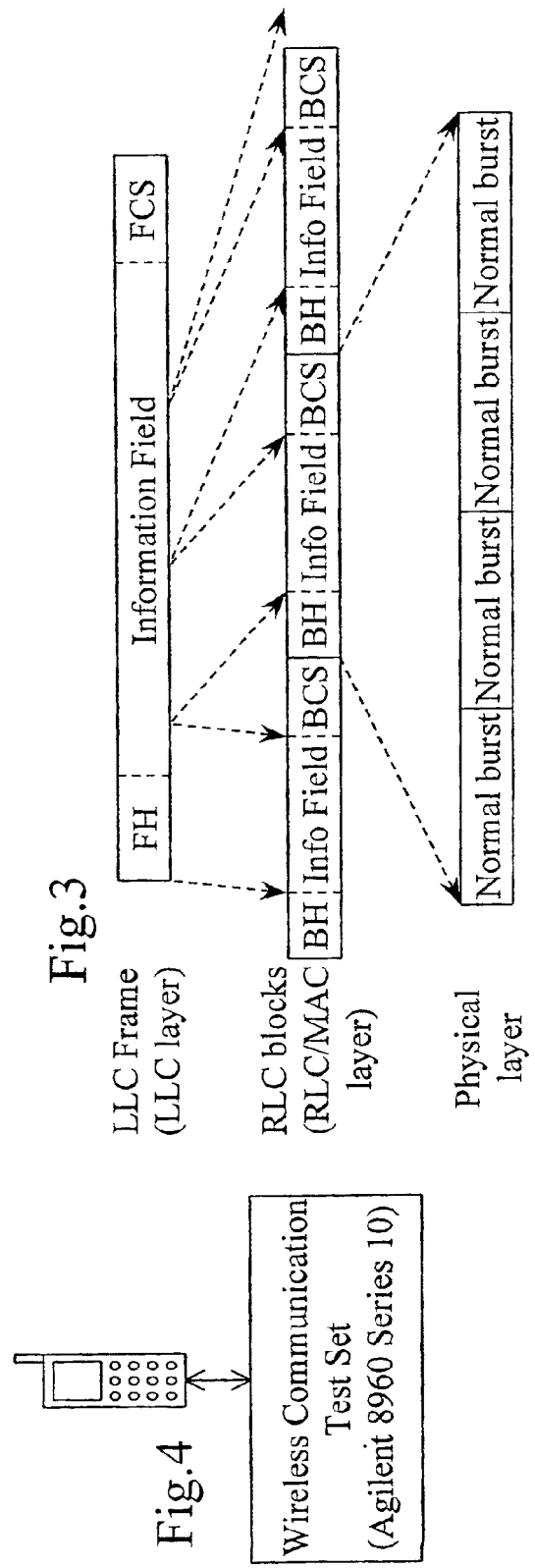
Fig.3
Fig.4

BLOCK ERROR RATIO MEASUREMENTS

TECHNICAL FIELD

This invention relates to measurements of block error ratio (BLER) in data communications systems, such as the general packet radio service (GPRS) being proposed for use on GSM wireless mobile communications systems.

BACKGROUND ART

An ETSI change request to GSM 04.14 (ETSI Document 2-00-1004) and the accompanying liaison statement response (ETSI Document 2-00-1007) has made significant changes to the general packet radio service (GPRS) test modes previously envisaged. As a consequence, there are some changes to the handling of the downlink temporary block flow (TBF) which preclude the making of block error ratio (BLER) measurements within the test mode. BLER measurements require a sustained flow of data blocks while the measurement is being made.

The ETSI Test Modes normally require only a GPRS mobility management service access point (GMM SAP) above the logical link control (LLC) layer, thus limiting the processing burden required to implement these test modes. If a full data connection were made, by adding a sub-network dependent convergence protocol (SNDCP) SAP and higher layers, to enable the BLER measurements which are no longer feasible in the test modes, there would be a resulting substantial and undesirable increase in the processing burden solely for the purpose of making these measurements.

It is an object of this invention to facilitate GPRS BLER measurements without imposing this extra processing burden.

DISCLOSURE OF INVENTION

According to one aspect of this invention there is provided a method of making block error ratio measurements in a layered protocol communications system, comprising the steps of:

opening and maintaining an information block flow by sending repeated message blocks which are defined at a selected layer in the protocol stack below the topmost layer; and monitoring ack/nack messages sent in response to the message blocks to determine whether the message blocks have been correctly transported.

BRIEF DESCRIPTION OF DRAWINGS

Methods and apparatus in accordance with this invention, for making BLER measurements on GPRS equipment, will now be described, by way of example, with reference to the accompanying drawings, in which:

FIG. 1 shows protocol layering used in a GPRS system;

FIG. 2 shows the format of a logical link control (LLC) data frame;

FIG. 3 illustrates the segmentation of LLC frames into Radio Link Control (RLC) data blocks;

FIG. 4 illustrates the use of a wireless communication test set with a mobile telephone unit to implement the invention;

BEST MODE FOR CARRYING OUT THE INVENTION, & INDUSTRIAL APPLICABILITY

Figure 5:
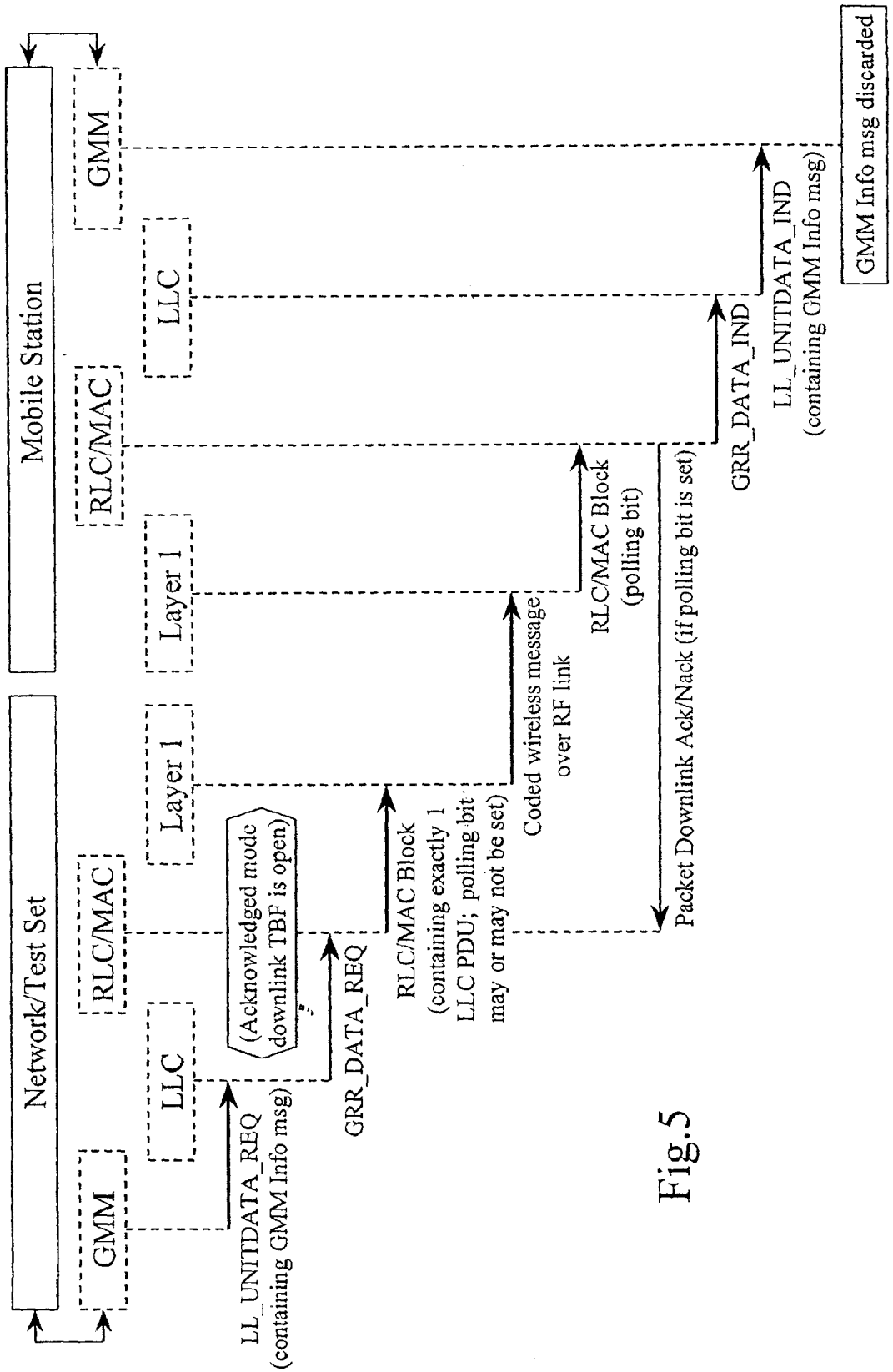
FIG. 5 is a message sequence chart illustrating a first embodiment of the invention.

The General Packet Radio Service (GPRS) is a set of GSM bearer services that provides packet mode data transmission within the GSM public land mobile radio network. It allows users to send and receive data in an end-to-end packet transfer mode, without using network resources in circuit-switched mode.

The GPRS radio interface can be modelled as a hierarchy of logical layers with specific functions, as shown in FIG. 1. Referring to FIG. 1, the physical link or Layer 1 at the bottom of the hierarchy provides services such as data unit framing and coding for information transfer over a physical RF channel between a mobile station and the network. Above this is the radio link control/medium access control (RLC/MAC) layer, which provides services for information transfer over the physical layer, including backward error correction by retransmission of erroneous blocks. The services of the RLC/MAC layer are used by the logical link control (LLC) layer, which provides individually identifiable logical link connections, sequence control, error detection/correction, flow control and ciphering. The LLC layer provides services to the SNDC layer, as well as the GMM, Short Message Service (SMS) and Tunnelling of Messages (TOM) protocols.

Network protocol data units (PDUs) for user's data are segmented by the SNDC for encapsulation into one or more LLC frames. The contents of GMM messages are likewise incorporated by the LLC layer into LLC frames. The format of an LLC frame is shown in FIG. 2, and comprises: a 1-octet address field and a control field of up to 36 octets, which together make up the frame header (FH); an information field which can have between 140 and 1520 octets, depending on the type of LLC frame; and a 3-octet frame check sequence (FCS) which consists of a 24-bit cyclic redundancy check (CRC) code derived from the frame header and information field.

Entire LLC frames are in turn segmented into RLC data blocks, as shown in FIG. 3. Each such data block comprises a block header (BH), an information field containing the LLC frame segment allocated to that block, and a block check sequence (BCS) which is used for error detection. The RLC data blocks are then passed to Layer 1 for modulation of bursts of RF energy on the physical transmission link.

The GPRS standards specify various tests to be performed on equipment, such as mobile stations and base stations, intended for use with GPRS. These tests include measurement of the rate of errors affecting the transfer of data blocks to and from items of equipment, that is the block error ratio or BLER. This measurement can be performed, for example as shown in FIG. 4, using a suitable wireless communication test set (such as the Agilent 8960 Series 10 available from Agilent Technologies) coupled to a mobile station via a direct RE connection. The test set contains software defining the GPRS hierarchy or stack of protocol layers, enabling it to emulate a mobile telephone base station and generate a data sequence which the mobile station receives and processes. The BLER can be determined by observation of the data blocks thereby transferred.

However, as noted above it is desirable to avoid having to establish a full data connection, including the use of SNDC and higher layers, in order to avoid excessive burden on the data processing capacity of the mobile station. Two techniques are proposed in accordance with this invention to enable this.

The first technique makes use of a constant stream of messages sent to the GMM SAP of the mobile station (MS) to open and maintain an RLC downlink temporary block flow (TBF) in acknowledged mode. This is consistent with the ETSI standards, and enables BLER measurements to be made simply by polling for packet ack/nack messages returned from the MS; the content of the ack/nack messages indicates whether the messages in the stream have been correctly transported. There is no need to implement any further protocol layer.

The direct RF link is configured to assign N timeslots to the downlink (from the test set to the mobile station). Each timeslot contains one RF burst, and four bursts in the same timeslot position in consecutive TDMA frames make up a radio block. One radio block is transmitted every 20 ms. One uplink timeslot transmits periodically (when requested) in each of four consecutive TDMA frames, to transmit one radio block containing a packet downlink ack/nack message from the mobile station.

An appropriate GMM message for this purpose is the GMM_INFORMATION message. The GMM Information procedure is described in GSM 04.08 section 4.7.12. Briefly, the network may send any number of GMM_INFORMATION messages at any time. The MS shall accept a GMM_INFORMATION message, and optionally use the information contained therein to update internal information stored within the MS.

Each information element of the GMM_INFORMATION message (other than the header) is optional. Therefore for purposes of BLER measurement no information elements are actually supplied. In this case the expected MS behaviour is simply to ignore the GMM_INFORMATION messages at the GMM layer. This presents a very low processing overhead to the MS, while still enabling an acknowledged mode RLC downlink TBF to be maintained.

FIG. 5 shows a Message Sequence Chart (MSC) for implementing this technique. After the MS has performed a GPRS attach procedure (GSM 04.08 section 4.7.3) and an acknowledged downlink TBF has been opened in a standard manner (GSM 04.60 section 8.1.2), the GMM layer is prompted to perform the sequence shown in FIG. 5. The sequence repeats such that the MS receives an RLC/MAC block in every radio block which was assigned to it upon opening of the acknowledged mode downlink TBF.

Figure 6:
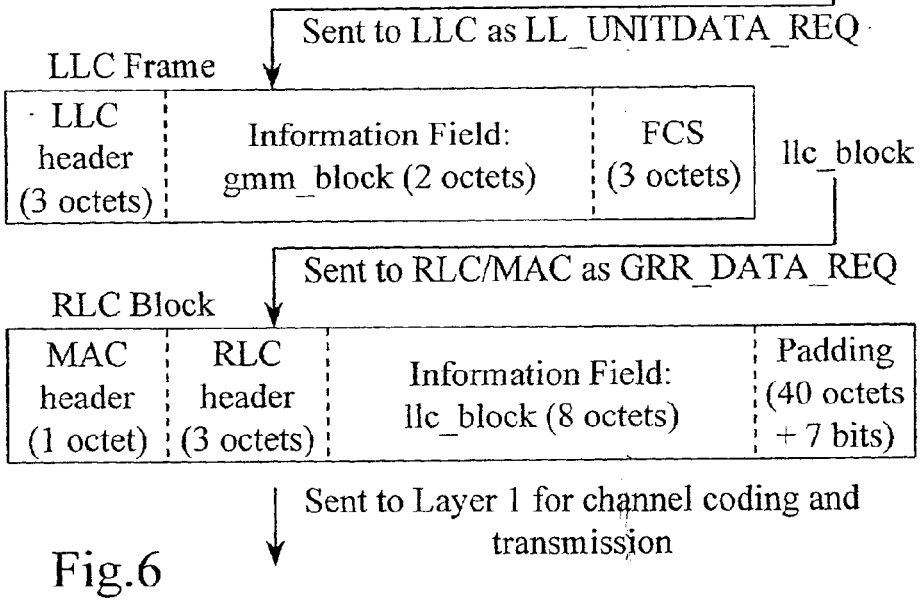
FIG. 6 illustrates the construction of a message sent to the mobile telephone unit in the embodiment of FIG. 5.

Referring to FIG. 5, the GMM layer sends an LL_UNITDATA_REQ (GSM 04.64 section 7.2.2.6), carrying a GMM_INFORMATION message, to the LLC layer. The GMM_INFORMATION message is created without any of the optional information elements. This message is then provided with an LLC three-octet header and a three-octet frame check sequence (FCS) to define an LLC frame which is sent to the RLC/MAC layer as a GRR_DATA_REQ (GSM 04.64 section 7.2.3.2). The message has an RLC header added to it, including the burst sequence number (BSN) which is incremented for each block (mod 128). Part of this RLC header is a length element which indicates how many octets of the message belong to the LLC Protocol Data Unit (PDU). Finally a MAC header is added. One important bit in this MAC header is the polling bit. This is set periodically (for example every 32 blocks), in order to cause the MS to send the Packet Downlink Ack/Nack message to inform the network (emulated by the test set) which of the previous RLC/MAC blocks were received successfully. This information is all that is needed for the BLER measurement. The RLC block is padded to fill the appropriate number of octets for the Layer One coding scheme that is to be used, and is then sent to Layer One where it is coded and transmitted to the MS. The construction of this RLC block for use with coding scheme CS4 is shown in FIG. 6.

The MS receives the data and decodes it. If it is correctly decoded, it will be forwarded to the RLC/MAC layer of protocol stack within the MS. When the polling bit is set the MS will transmit a Packet Downlink Ack/Nack message to the network (test set) on the specified radio block. The Packet Downlink Ack/Nack message contains information from which the test set can determine which BSN numbers have been correctly received and which have not. As it knows which BSN numbers it has transmitted, it can derive the BLER.

The MAC and RLC headers are removed and the remainder of the message is passed to the LLC layer as a GRR_DATA_IND. There the FCS and LLC header are processed and removed, and the remainder of the message is passed to the GMM layer as a LL_UNITDATA_IND. At the GMM layer the message is found to be a GMM_INFORMATION message. It is processed and, being empty, no further action is taken.

The second technique also allows an RLC acknowledged mode TBF to be held open and then uses the polling for packet ack/nack to facilitate the BLER measurement. However, there is a difference in the data which are sent.

The first thing that the LLC layer does upon receipt of an LLC PDU is to verify that the FCS in the incoming data is correct. If the FCS is incorrect the LLC layer should discard the data and take no further action.

Therefore in the second technique a constant stream of messages is sent to the LLC layer with an incorrect FCS. These messages will pass through the RLC/MAC layer and appear correct to it, but will be discarded by the LLC layer. It is then possible to poll for packet ack/nack messages from the RLC/MAC layer as before to determine the BLER.

Figure 7:
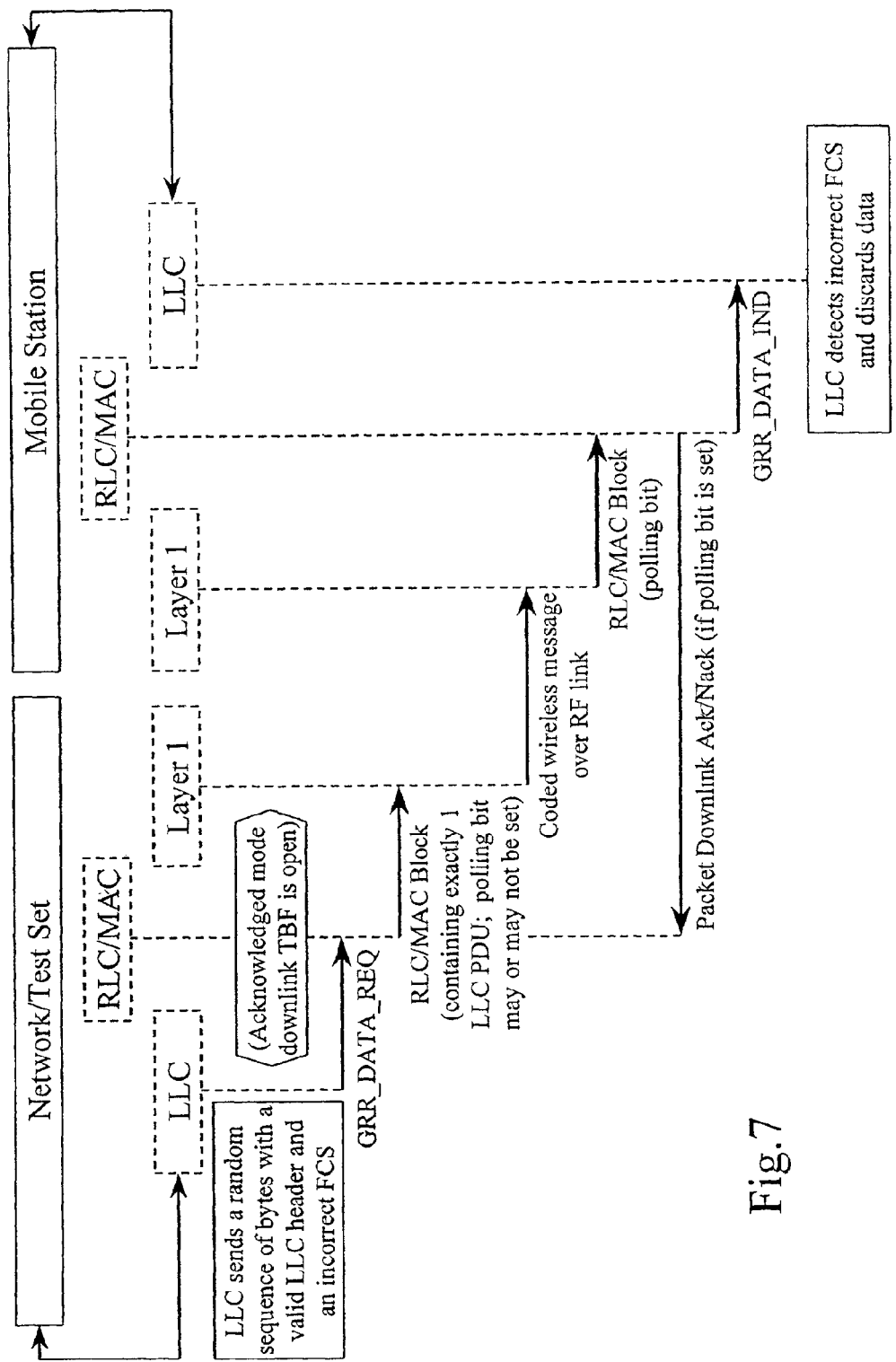
FIG. 7 is a message sequence chart illustrating a second embodiment of the invention.

The procedure is illustrated in FIG. 7. As before the procedure is performed after the MS has performed a GPRS attach procedure (GSM 04.08 section 4.7.3) and an acknowledged mode downlink TBF has been opened. The LLC layer is prompted to repeat the sequence shown in FIG. 5 such that the MS receives an RLC/MAC block on every radio block which was assigned to it upon opening of the acknowledged mode downlink TBF.

The LLC layer creates a random sequence of data, based on the coding scheme that will be used at Layer One. A valid LLC header is added and the FCS is computed. The FCS is then deliberately made incorrect, by calculating its inverse, and this incorrect FCS is attached to the rest of the data. These data are then sent to the RLC/MAC layer as a GRR_DATA_REQ.

Figure 8:
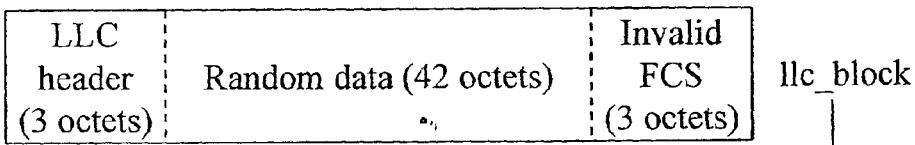
FIG. 8 illustrates the construction of a message sent to the mobile telephone unit in the embodiment of FIG. 7.
Figure 8:
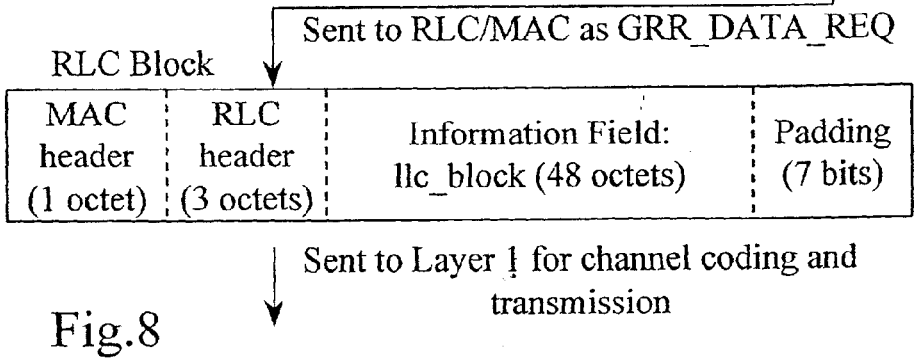

As in the first technique, the message has an RLC header added to it, including the burst sequence number (BSN) which is incremented for each block (mod 128). It also has a length element added, indicating how many octets of the message belong to the LLC PDU. Finally a MAC header is added, including the polling bit. This is set periodically to cause the MS to send a Packet Downlink Ack/Nack message which informs the network (test set) which of the previous RLC/MAC blocks were received successfully. The message is padded to fill the appropriate number of octets for the Layer One coding scheme to be used, and sent to Layer One for coding and transmission to the MS. The construction of this message, using coding scheme 4, is shown in FIG. 8.

The MS receives the radio block and decodes it. If it is correctly decoded, it is sent to the RLC/MAC layer in the MS's protocol stack. When the polling bit is set the MS will transmit a Packet Downlink Ack/Nack message on the specified radio block. The Packet Downlink Ack/Nack message contains information from which the test set can identify which BSN numbers have been received and which have not. As the test set knows which BSN numbers it has transmitted, it can derive the BLER.

The MAC and RLC headers are removed and the remainder of the message is passed to the LLC layer as a GRR__DATA__IND. There, however, the FCS is found to be incorrect. The specified procedure (GSM 04.64 section 5.8) is for the frame to be discarded without notification to the sender, thus allowing the measurement to continue without interruption from the MS and without the burden of processing the message at any higher level in the protocol stack.

What is claimed is:

1. A method of making measurements of block error ratio in a layered protocol communications system, the block error ratio being a ratio of a number of blocks received with one or more errors to a total number of blocks received, the method comprising:

sending at least one message block which is defined at a selected layer in a protocol stack below a topmost layer thereof to open an information block flow and sending additional such message blocks to maintain the information block flow;

monitoring ack/nack messages sent in response to the message blocks to determine whether the message blocks have been correctly transported; and calculating said block error ratio measurements based at least in part on the monitored ack/nack messages.

2. The method of claim 1, wherein the message blocks have a predetermined characteristic which causes the message blocks to be discarded upon processing at the selected protocol layer in a communications unit receiving the message blocks.

3. The method of claim 1, wherein the communications system is a general packet radio service (GPRS) and the selected protocol layer is a GPRS mobility management layer.

4. The method of claim 3, wherein the repeated message blocks are GMM__INFORMATION message blocks, said GMM__INFORMATION message blocks being information message blocks associated with the general packet radio service (GPRS).

5. The method of claim 4, wherein the predetermined characteristic comprises absence from a message block of any information elements other than a message header.

6. The method of claim 1, wherein the communications system is a general packet radio service (GPRS) and the selected protocol layer is a GPRS logical link control layer.

7. The method of claim 6, wherein the repeated message blocks are GRR__DATA__REQ message blocks, wherein said GRR__DATA__REQ message blocks are information blocks associated with the general packet radio service (GPRS).

8. The method of claim 7, wherein the predetermined characteristic comprises inclusion in a message block of an invalid frame check sequence.

9. The method of claim 1 wherein the steps of sending at least one message block to open an information block flow and sending additional such message blocks to maintain the information block flow occurs at a transmitting station and wherein the step of monitoring ack/nack messages sent in response to the message blocks also occurs at said transmitting station.

10. A method of making measurements of block error ratio in a layered protocol communications system, the block error ratio being a ratio of a number of blocks received with one or more errors to a total number of blocks received, the method comprising:

constructing message blocks to conform to a message structure defined at a selected layer below a topmost layer in a protocol stack of the layered protocol communications system;

sending at least one of said message blocks through the system to open an information block flow and sending additional such message blocks through the system to maintain the information block flow;

monitoring ack/nack messages sent in response to the message blocks to determine whether the message blocks have been correctly transported; and measuring block error ratio as a predetermined function of occurrence of monitored nack messages.

11. The method of claim 10, wherein the message blocks are constructed to have a predetermined characteristic that causes the message blocks to be discarded upon processing at the selected protocol layer in a communications unit receiving the message blocks.

12. The method of claim 10, wherein the communications system is a general packet radio service (GPRS) and the selected protocol layer is a GPRS mobility management layer.

13. The method of claim 12, wherein the repeated message blocks are GMM__INFORMATION message blocks, wherein said GMM__INFORMATION message blocks are information message blocks associated with the general packet radio service (GPRS).

14. The method of claim 13, wherein the message blocks are constructed to have a predetermined characteristic that causes the message blocks to be discarded upon processing at the selected protocol layer in a communications unit receiving the message blocks, the predetermined characteristic comprising absence from a message block of any information elements other than a message header.

15. The method of claim 14, wherein the message blocks are constructed to have a predetermined characteristic that causes the message blocks to be discarded upon processing at the selected protocol layer in a communications unit receiving the message blocks, the predetermined characteristic comprising inclusion in a message block of an invalid frame check sequence.

16. The method of claim 10, wherein the communications system is a general packet radio service (GPRS) and the selected protocol layer is a GPRS logical link control layer.

17. The method of claim 16, wherein the repeated message blocks are GRR__DATA__REQ message blocks, wherein said GRR__DATA__REQ message blocks are information associated with the general packet radio service (GPRS).

18. A method of making measurements of block error ratio in a general packet radio service (GPRS) layered protocol communications system, the block error ratio being a ratio of a number of blocks received with one or more errors to a total number of blocks received, the method comprising:

constructing message blocks to conform to a message structure defined at a selected one of (i) a GPRS mobility management layer and
(ii) a GPRS logical link control layer
    in a protocol stack of the GPRS layered protocol communications system, said message blocks being respectively one of
(i) GMM_INFORMATION message blocks defined in the mobility management layer, wherein said GMM_INFORMATION message blocks are information message blocks associated with the general packet radio service (GPRS), and
(ii) GRR_DATA_REQ message blocks defined in the logical link control layer, wherein said GRR_DATA_REQ message blocks are information associated with the general packet radio service (GPRS);

sending at least one of said message blocks through the system to open an information block flow and sending additional such message blocks through the system to maintain the information block flow;

monitoring ack/nack messages sent in response to the message blocks to determine whether the message blocks have been correctly transported; and measuring block error ratio as a predetermined function of occurrence of monitored nack messages.

19. The method of claim 18, wherein the message blocks are constructed to have a predetermined characteristic that causes the message blocks to be discarded upon processing at the selected protocol layer in a communications unit receiving the message blocks.

20. The method of claim 19, wherein the predetermined characteristic comprises:
(i) absence from a message block of any information elements other than a message header in the case of GMM_INFORMATION message blocks, wherein said GMM_INFORMATION message blocks are information message blocks associated with the general packet radio service (GPRS), and
(ii) inclusion in a message block of an invalid frame check sequence in the case of GRR_DATA_REQ message blocks, wherein said GRR_DATA_REQ message blocks are information associated with the general packet radio service (GPRS).

21. Apparatus for making measurements of block error ratio in a layered protocol communications system, the block error ratio being a ratio of a number of blocks received with one or more errors to a total number of blocks received, the apparatus comprising:

a message block transmitter for constructing message blocks to conform to a message structure defined at a selected layer below a topmost layer in a protocol stack of the layered protocol communications system, and for sending at least one of said message blocks through the system to open an information block flow and sending additional such message blocks through the system to maintain the information block flow; and a monitor for monitoring ack/nack messages sent in response to the message blocks to determine whether the message blocks have been correctly transported, and for measuring block error ratio as a predetermined function of occurrence of monitored nack messages.

22. Apparatus for making measurements of block error ratio in a general packet radio service (GPRS) layered protocol communications system, the block error ratio being a ratio of a number of blocks received with one or more errors to a total number of blocks received, the apparatus comprising:

a message block transmitter for constructing message blocks to conform to a message structure defined at a selected one of
(i) a GPRS mobility management layer and
(ii) a GPRS logical link control layer
    in a protocol stack of the GPRS layered protocol communications system, said message blocks being respectively one of
(i) GMM_INFORMATION message blocks defined in the mobility management layer, wherein said GMM_INFORMATION message blocks are information message blocks associated with the general packet radio service (GPRS), and
(ii) GRR_DATA_REQ message blocks defined in the logical link control layer, wherein said GRR_DATA_REQ message blocks are information blocks provided with a three-octet header and a three-octet frame check sequence, and sending at least one of said message blocks through the system to open an information block flow and sending additional such message blocks through the system to maintain the information block flow; and a monitor for monitoring ack/nack messages sent in response to the message blocks to determine whether the message blocks have been correctly transported, and for measuring block error ratio as a predetermined function of occurrence of monitored nack messages.

* * * * *